(12) United States Patent
Farrar et al.

(10) Patent No.: US 6,890,454 B2
(45) Date of Patent: May 10, 2005

(54) OPTICAL BRIGHTENERS COMPOSITIONS THEIR PRODUCTION AND THEIR USE

(75) Inventors: John Martin Farrar, Leeds (GB); Andrew Clive Jackson, Harrogate (GB); Alec Stewart Tindal, Leeds (GB)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 10/451,818

(22) PCT Filed: Jan. 8, 2002

(86) PCT No.: PCT/IB02/00039

§ 371 (c)(1),
(2), (4) Date: Jun. 25, 2003

(87) PCT Pub. No.: WO02/055646

PCT Pub. Date: Jul. 18, 2002

(65) Prior Publication Data

US 2004/0074021 A1 Apr. 22, 2004

(30) Foreign Application Priority Data

Jan. 10, 2001 (GB) .............................................. 0100610

(51) Int. Cl.$^7$ .............................. C11D 3/42; D06L 3/12; D21H 21/30
(52) U.S. Cl. ........................... 252/301.21; 252/301.22; 252/301.26; 252/301.23; 8/119; 8/189; 8/648; 544/193.2; 544/83; 427/158; 162/135; 162/158; 162/162; 162/169; 162/168.1
(58) Field of Search ...................... 252/301.21, 301.22, 252/301.23, 301.26; 8/119, 189, 648; 544/193.2, 83; 427/158; 162/135, 158, 162, 169, 168.1

(56) References Cited

U.S. PATENT DOCUMENTS

| | | | | |
|---|---|---|---|---|
| 3,728,275 A | * | 4/1973 | Horlucher et al. | ..... 252/301.23 |
| 4,263,176 A | * | 4/1981 | Martini et al. | ............... 510/394 |
| 4,466,900 A | * | 8/1984 | Horlacher et al. | ..... 252/301.23 |
| 4,717,502 A | * | 1/1988 | Schmid | .................. 252/301.23 |
| 5,493,022 A | | 2/1996 | Kaul et al. | |
| 5,518,657 A | | 5/1996 | Fringeli et al. | |
| 5,873,913 A | | 2/1999 | Cowman et al. | |
| 6,025,490 A | * | 2/2000 | Feldhues et al. | .......... 544/193.2 |
| 6,165,973 A | * | 12/2000 | Baker | .......................... 510/516 |
| 2003/0010459 A1 | | 1/2003 | Farrar et al. | |
| 2003/0013628 A1 | | 1/2003 | Farrar et al. | |

FOREIGN PATENT DOCUMENTS

WO    WO 00/46336    8/2000

OTHER PUBLICATIONS

Findley, William R., "Fluorescent Whitening Agents for Modern Detergents," J. of the American Oil Chemists Society, V. 65, pp. 679–683 (1988).

* cited by examiner

Primary Examiner—C. Melissa Koslow
(74) Attorney, Agent, or Firm—Anthony A. Bisulca

(57) ABSTRACT

The invention relates to an optical brightener mixture (W) comprising optical brighteners (A) of formula (Ia), and (B) of formula (Ib) and optionally (C) of formula (Ic) as defined herein, their concentrated aqueous solutions (S), their production and their use.

36 Claims, No Drawings

OPTICAL BRIGHTENERS COMPOSITIONS THEIR PRODUCTION AND THEIR USE

In the handling of water soluble optical brighteners it is often desired to use pre-formulated concentrated aqueous solutions, e.g. for ease of handling and metering. It is also desired to receive such concentrated solutions—especially in a storage stable form of a given standard concentration—from the supplier, in order to avoid time-consuming dissolving of dry products, e.g. in the form of powders, in the application plant. Consequently a further requirement for the concentrated solutions is that they be stable to such conditions as may occur during transportation and storage, e.g. frost and heat conditions. In the case of optical brighteners with a limited number of water solubilizing substituents, in particular sulpho groups, more specifically optical brighteners of the 4,4'-bis-triazinylamino-stilbene disulphonic acid series which at each triazinyl ring contain an anilino substituent that does not contain any sulpho group as a substituent, and an aliphatic amino radical that contains no sulpho group, their solubility may be insufficient for producing concentrated aqueous solutions, and the corresponding aqueous compositions may then just be suspensions, which need the addition of suspension stabilising additives, or if an aqueous concentrate solution can be produced—e.g. with the aid of a substantial proportion of a solubiliser or hydrotrope such as urea or a polyethyleneglycol—, the stability to storage and transportation thereof may vary with concentration, especially insofar as at lower concentrations, such as in the range of 15 to 30%, at which the solutions are also less viscous and thus easier to handle, the stability of the solutions may even be worse than at higher concentrations, while the use of substantial proportions of additives, such as urea or polyethyleneglycol, correspondingly increases the burden in the backwater (as N-content or COD) of the application plant. With a particular choice of the counterions for the sulphonic acid groups there may be achieved a certain partial improvement, but the storage stability may still represent a problem, especially under varying temperature conditions.

WO 0046336 A1 discloses an optical brightener mixture of 4,4'-bis-(4-sulphophenylamino-6-di-ethanolamino-2-s.triazinylamino)-stilbene-2,2'-disulphonic acid, 4,4'-bis-(4-sulphophenylamino-6-diisopropanolamino-2-s.triazinylamino)-stilbene-2,2'-disulphonic acid and the corresponding asymmetrical compound, in triethanolamine salt form. These compounds contain four strongly water solubilizing, aromatically linked sulphonate groups and in the examples they are produced in the form of aqueous solutions.

U.S. Pat. No. 5,518,657 discloses aqueous suspensions of mixtures of optical brighteners of the distilbene-disulphonic acid series and of the 4,4'-bistriazinylamino-stilbene-2,2'-disulphonic acid series which according to the generic definition in the specification may contain as substituents at the available 4- and 6-positions of the triazinylamino radicals phenylamino and the radical of an aliphatic amine (in the generic portion of the specification there are mentioned morpholine, piperidine and amines substituted with $C_{1-4}$-alkyl, benzyl, cyclohexyl, ethylcyclohexyl, β-hydroxyethyl, β-hydroxypropyl, β-cyanoethyl, 2-methoxy- or -ethoxy-ethyl or 3-methoxy-propyl). Of the latter brighteners there are specifically mentioned in the examples: 4,4'-bis-(4-phenylamino-6-morpholino-2-s.triazinylamino)-stilbene-2,2'-disulphonic acid and 4,4'-bis-(4-phenylamino-6-ethylamino-2-s.triazinylamino)-stilbene-2,2'-disulphonic acid. These aqueous suspensions of the defined optical brightener mixtures are formulated with electrolytes, an anionic polysaccharide (in the examples Xanthan) and a dispersant (in the examples an anionic dispersant) for stabilisation.

It has now surprisingly been found that with a combination of two particular groups of optical brighteners of the anilino-substituted 4,4'-bis-triazinylamino-stilbene disulphonic acid series with aliphatic amino substitution at the triazinyl rings and with no sulpho group at the anilino substituent, there may be produced concentrated aqueous solutions and there may be achieved an unexpectedly satisfactory stability of the aqueous solutions at any concentration even under varying temperature conditions, while the addition of any solubilising or stabilising additive may be reduced to a minimum or even be avoided at all.

The invention relates to the particular mixture of the below defined optical brighteners and certain asymmetrical optical brighteners, their concentrated aqueous compositions (in particular solutions), their production and their use.

The invention thus firstly provides an optical brightener mixture (W) comprising an optical brightener (A) of formula

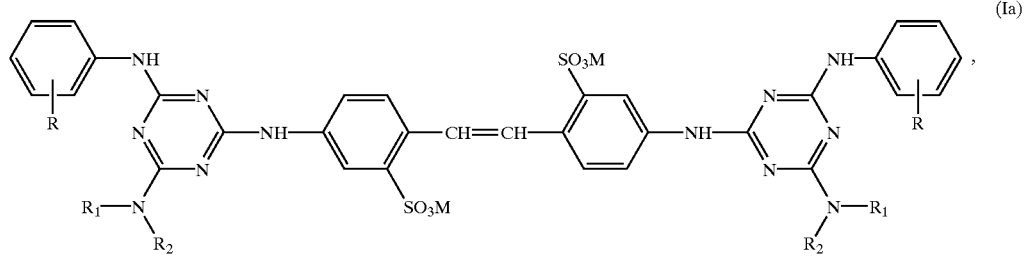

(Ia)

wherein

R signifies hydrogen or methyl, $R_1$ signifies hydrogen, unsubstituted $C_{1-6}$-alkyl, $C_{1-6}$-alkyl substituted with carbamoyl or carboxy, $C_{2-6}$-alkyl substituted with hydroxy or methoxy, hydroxy- or methoxy-$(C_{2-3}$-alkoxy)-$(C_{2-3}$-alkyl), $R_2$ signifies $C_{1-6}$-alkyl substituted with carbamoyl or carboxy, or $R_1$ and $R_2$ together with the nitrogen to which they are linked form a carboxypyrrolidine ring, and M signifies an equivalent of a cation, and an optical brightener (B) of formula

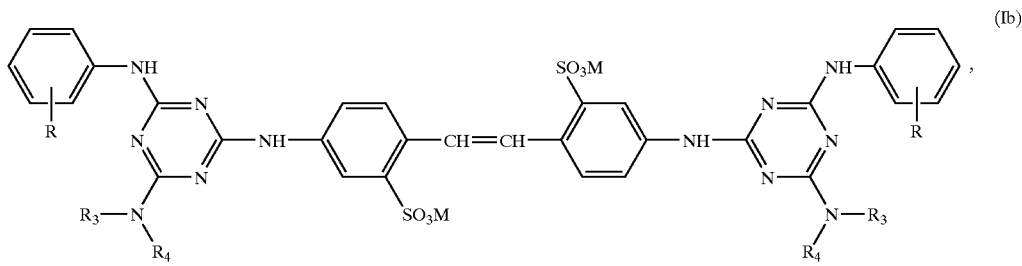

wherein
R signifies hydrogen or methyl,
$R_3$ signifies hydrogen, unsubstituted $C_{1-6}$-alkyl, $C_{2-6}$-alkyl substituted with hydroxy or methoxy, or hydroxy- or methoxy-($C_{2-3}$-alkoxy)-($C_{2-3}$-alkyl),
$R_4$ signifies hydrogen, unsubstituted $C_{1-6}$-alkyl, $C_{2-6}$-alkyl substituted with hydroxy or methoxy, or hydroxy- or methoxy-($C_{2-3}$-alkoxy)-($C_{2-3}$-alkyl),
or
$R_3$ and $R_4$ together with the nitrogen to which they are linked form a morpholine ring,
and
M signifies an equivalent of a cation.

If in the above formulae (Ia) or (Ib) R signifies methyl, this may be in any of the positions ortho, meta or para to the amino group, preferably R signifies hydrogen. If alkyl in any of the significances of $R_1$, $R_2$, $R_3$ or $R_4$ contains 3 to 6 carbon atoms it may be linear or branched; if it contains 6 carbon atoms it may also be cyclic. Among the unsubstituted $C_{1-6}$-alkyl groups the lower molecular ones are preferred, in particular those with 1 to 3 carbon atoms, namely methyl, ethyl, propyl and isopropyl, especially methyl and ethyl. Among the $C_{1-6}$-alkyl groups substituted with carbamoyl or carboxy in any of the significances of $R_1$ or $R_2$ the lower molecular ones are preferred, in particular those with 1 to 3 carbon atoms in the alkyl radical, namely methyl. ethyl, propyl and isopropyl, especially methyl, ethyl and isopropyl. Among the $C_{2-6}$-alkyl groups substituted with hydroxy or methoxy the lower molecular ones are preferred, in particular those with 2 or 3 carbon atoms in the alkyl radical, especially ethyl and isopropyl. In the $C_{2-3}$-alkyl radicals substituted with hydroxy or methoxy or hydroxy-$C_{2-3}$-alkoxy or methoxy-$C_{2-3}$-alkoxy the substituent is preferably in the β-position.

$R_1$ preferably signifies unsubstituted $C_{1-3}$-alkyl or $C_{2-3}$-alkyl substituted with hydroxy. $R_2$ preferably signifies $C_{2-3}$-alkyl substituted with carboxy or preferably carbamoyl.

$R_3$ preferably signifies unsubstituted $C_{1-3}$-alkyl or $C_{2-3}$-alkyl substituted with hydroxy. $R_4$ preferably signifies unsubstituted $C_{1-3}$-alkyl or $C_{2-3}$-alkyl substituted with hydroxy.

M may be in general an equivalent of any cation as conventionally present in anionic optical brighteners, especially a non-chromophoric cation that favours water solubility of the brightener, in particular an alkali metal cation, preferably lithium, sodium or potassium, or an ammonium cation, in particular unsubstituted ammonium or ammonium substituted with 1 to 3 low molecular alkyl or hydroxyalkyl groups, preferably $C_{1-4}$-alkyl and $C_{2-3}$-hydroxyalkyl, e.g. methyl, ethyl, β-hydroxyethyl and β-hydroxypropyl; among the ammonium cations are preferred mono-, di- and/or triethanolammonium and mono-, di- and/or triisopropanolammonium. The cation equivalents M may all be of one kind or may be the equivalents of two or more different cations. According to a particular feature of the invention, the brighteners contain two or more different cations M, e.g. ammonium and alkali metal cations, or unsubstituted ammonium and substituted ammonium, or alkali metal and substituted ammonium cations, or unsubstituted ammonium and alkali metal and substituted ammonium cations, the counterions M may preferably be a mixture of one or more substituted ammonium cations with an alkali metal and/or unsubstituted ammonium cation. The substituted ammonium cations are preferably tertiary ammonium cations.

The above optical brighteners (A) and (B) are known compounds or/and may be produced by known methods or analogously to known methods, in particular by reaction of cyanuric halide, preferably cyanuric chloride, with the amines of formulae

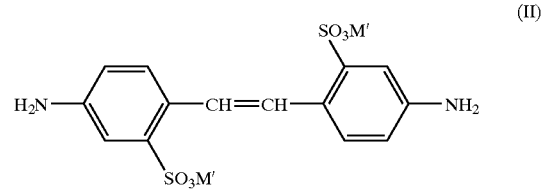

in which M' signifies an alkali metal cation,

and either

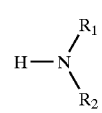

for producing optical brighteners of formula (Ia), or

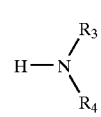

for producing optical brighteners of formula (Ib).

The reaction is in general a dehydrohalogenation and is suitably carried out under dehydrohalogenating conditions.

The sequence of the reactions is in any desired order. The cyanuric halide, preferably cyanuric chloride, is preferably reacted first with the diamine of formula (II), the product is then reacted with the aromatic amine of formula (III) to give an intermediate of formula

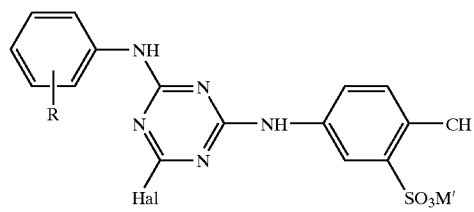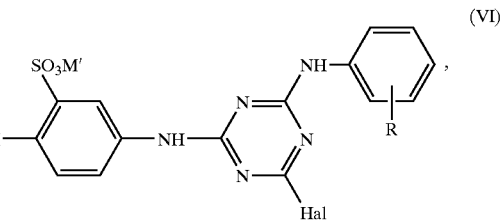

(VI)

in which Hal signifies halogen, preferably chlorine, which is then reacted with the aliphatic amine of formula (IV) or (V) respectively The mixtures of optical brighteners (A) and (B) may be produced by processes conventional per se, in particular by mixing (A) with (B) optionally in the presence of water or by reacting an intermediate product of formula (VI) with amines of formulae (IV) and (V) sequentially or in admixture.

By the reaction of the intermediate of formula (VI) with the amines of formulae (IV) and (V) sequentially or in admixture there are formed the optical brighteners (A) and (B) of formulae (Ia) and (Ib) in admixture, and further there is also formed an optical brightener (C) of formula

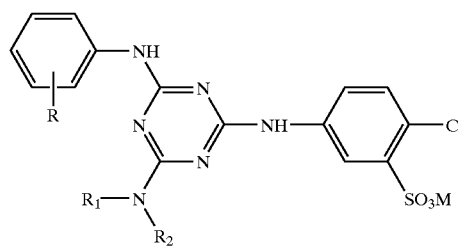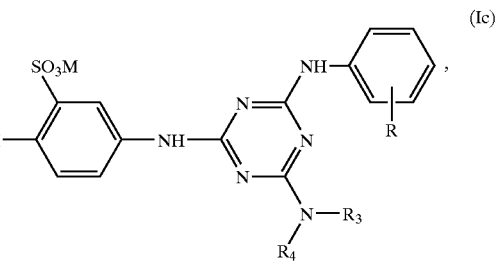

(Ic)

components (A), (B) and (C) being in statistical distribution.

The mixture (W) may thus be a mixture of (A) and (B) or also a mixture of (A), (B) and (C).

The reactions of the halogens of the cyanuric halide with the respective amines take place suitably under dehydrohalogenating conditions. For substitution of the first halogen of the cyanuric halide, in particular for the reaction with the diamine of formula (II), it is preferred to operate at a temperature in the range of 0 to 20° C. and under distinctly acidic to neutral pH conditions preferably in the pH-range of 1 to 7. For substitution of the second halogen of the cyanuric halide, in particular for producing the intermediate product of formula (VI), it is preferred to operate at a temperature in the range of 20 to 60° C. and under weakly acidic to weakly alkaline conditions, preferably at a pH in the range of 4 to 8. For substitution of the third halogen of the cyanuric halide, in particular the reaction of a compound of formula (VI) with the aliphatic amine of formula (IV) or (V) or with the amines of formulae (IV) and (V) in admixture or sequentially, it is preferred to operate at a temperature in the range of 60 to 100° C. or reflux and under weakly acidic to distinctly alkaline conditions, preferably at a pH in the range of 4 to 10, more preferably 7 to 10 The aliphatic amine is preferably employed in excess over the stoichiometric quantity, e.g. in an excess of $\geqq 5$ mol-%, e.g. in the range of 5–100 mol-% preferaby 20 to 80 mol-%. The pH may be controlled by addition of suitable bases, preferred bases being those suitable for providing the above mentioned cations M, e.g. alkali metal (e.g. lithium, sodium or potassium) hydroxides, carbonates or bicarbonates, ammonia or—for the reaction of the third halogen of cyanuric halide, i.e. for the condensation of the intermediate of formula (VI) with the aliphatic amines of formula (IV) or (V)—also low molecular tertiary aliphatic amines such as tri-($C_{1-4}$-alkyl- or/and $C_{2-3}$-hydroxyalkyl)-amines, among which tri-ethanol- or -isopropanol-amine, are particularly preferred.

Where the mixtures (W) are produced by mixing (A) with (B), these may be in dry form, e.g. as powders, that are dry-mixed with each other, or in the form of aqueous solutions of each of (A) and (B), which are mixed with each other. Where (W) is a mixture of (A), (B) and (C), it is expediently produced by the above reaction of the intermediate of formula (VI) with the amines of formulae (IV) and (V) sequentially or in admixture.

The molar ratio of the mixture components of (W) may be related to the molar ratio of the starting aliphatic amines of formulae (IV) and (V) employed for producing the mixures of (A) and (B) or of (A), (B) and (C). The molar ratio of the amines of formulae (IV) and (V) is preferably in the range of 10/90 to 90/10, advantageously 25/75 to 75/25, preferably 40/60 to 60/40. Thus, if (W) is a mixture of optical brighteners (A) and (B) the molar ratio (A)/(B) preferably is in the range of 10/90 to 90/10, advantageously 25/75 to 75/25, preferably 40/60 to 60/40. If (W) is a mixture of (A), (B) and (C), their molar ratio will correspond to the statistical distribution resulting from the use of the mixture of amines of formulae (IV) and (V) in the stated molar ratio, i.e. 10/90 to 90/10, advantageously 25/75 to 75/25, preferably 40/60 to 60/40.

In the mixtures (W) the cations in the significance of M are preferably selected from:

$M_1$ alkali metal cations (e.g. lithium, sodium or potassium) and unsubstituted ammonium and $M_2$ ammonium mono-, di- or trisubstituted with $C_{1-4}$-alkyl and/or $C_{2-3}$-hydroxyalkyl.

$M_1$ preferably is an alkali metal cation, more preferably sodium. $M_2$ preferably is a mono-, di- or tri-($C_{2-3}$-hydroxyalkyl)-ammonium cation, more preferably triethanolammonium. Preferably at least 50 mol-% of $M_2$ is a tertiary ammonium as described above, more preferably triethanolammonium According to a preferred feature cations $M_1$ and $M_2$ are both present as M in the mixture (W).

The ionic ratio $M_1/M_2$ is e.g. in the range of 10/90 to 90/10, advantageously 25/75 to 75/25, preferably 40/60 to 60/40.

The cations M, in particular $M_1$ and $M_2$, are suitably chosen in such a kind and ratio that the optical brightener mixture (W) is sufficiently water soluble to give a concentrated aqueous solution, e.g. of a concentration $\geq 3\%$. Preferably the (W)-concentration in the aqueous (W)-solution is in the range of 5 to 60%, advantageously 8 to 50%, more preferably 12 to 40%, especially 15–35% by weight, a typically preferred concentration range being 20 to 30% by weight.

The optical brightener mixtures (W) are usually obtained in a water soluble salt form, in which the salt forming cations are as resulting from the synthetic conditions or/and may be replaced e.g. by methods conventional per se, such as precipitation by acidification (e.g. with strong mineral acids, e.g. hydrochloric, sulphuric, phosphoric or nitric acid) and salt formation with the desired base (e.g. amine) or by treatment with suitable ion exchange resins or acid resins in the presence of an amine. The produced (W)-solutions (S) may contain some salts, in particular halides, preferably chlorides, of the stated cations, mostly inorganic salts, mainly sodium chloride, as resulting from the dehydrohalogenation reaction and/or optionally other salts resulting from precipitation with an acid. According to a preferred feature the content of these extraneous electrolytes in the (W)-solution (S) is reduced to a minimum, in particular to less than 5% by weight referred to (W), e.g. in the range of 0.01 to 5%, preferably to $\leq 4\%$, e.g. in the range of 0.1 to 4%.

The invention thus also provides an aqueous composition, in particular solution (S'), of (W), in which the content of extraneous electrolytes, i.e. other than those involved in salt formation in (A) and (B),—especially of inorganic salts—is less than 5% by weight referred to the weight of (W).

This reduction of the content of extraneous electrolytes may be achieved by methods conventional per se in the art or analogously to conventional methods, e.g. by membrane filtration or by acidification precipitation, filtration and salt formation by addition of bases, or by separation in a two-phase system of two liquid phases, one of which preferentially dissolves the optical brightener, the other preferentially dissolves the above mentioned extraneous electrolytes, mainly sodium chloride. According to a further feature of the process, the above described reaction of the third halogen of cyanuric halide, i.e. the reaction of the compound of formula (VI) with the aliphatic amines of formula (IV) or/and (V), can be carried out in such a two phase system. The above optical brighteners, i.e. (A), (B) or (C) or the mixture (W), together with water—preferably in the form of concentrated aqueous solutions (S) of the above mentioned (W) concentrations—and optionally also together with the above tertiary amines, especially triethanolamine or triisopropanolamine, optionally in salt (especially chloride) form, may form with heating in particular to a temperature >42° C., preferably in the range of 45 to 90° C., a liquid mixture which, on cooling, in particular to a temperature <42° C., preferably in the range of 10 to 40° C., more preferably 15–38° C., settles out as an organic phase and may be separated as the lower layer from the salt-containing aqueous phase which constitutes the upper layer. Preferably at least 30 mol-% of the inorganic cations are shifted and replaced by such tertiary ammonium ions e.g. 30 to 90, preferably 40 to 80 mol-%. Where the above reaction of the intermediate of formula (VI) with the aliphatic amine is carried out under such conditions that a two phase system is formed, the aliphatic amines (IV) and (V) are preferably employed in a larger excess over the stoichiometric quantity, e.g. in an excess of 50–100 mol-% over the stoichiometric quantity.

The process for the production of these (W)-containing compositions or solutions (S) with reduced content of extraneous electrolytes, in particular concentrated aqueous (W)-solutions (S'), is in particular characterized in that a) a salt-containing aqueous solution (S") of (W) is desalinated by membrane filtration, or b) the mixture (W) is precipitated in acid form by acidification of a salt-containing aqueous solution (S") of (W) with a strong mineral acid (e.g. HCl, $H_2SO_4$, $H_3PO_4$, $HNO_3$), separated, e.g. by filtration, and redissolved in salt form by reaction with the suitable base or base mixture, or c) the (W)-solution (S") is treated with an acid ion exchange resin or acid membrane in the presence of amine as suitable for introducing $M_2$, or d) the salt-containing mixture (W), preferably in the form of a salt containing solution (S"), is selectively separated in a system of two liquid phases $L_1$ and $L_2$, of which $L_1$ is aqueous and dissolves the extraneous electrolytes and $L_2$ is organic and contains (W) and may contain a minor proportion of dissolved water, and the desalinated (W)-containing phase $L_2$ is separated from the salt-containing aqueous phase $L_1$, or the salt-containing mixture (W) is selectively dissolved in a system of two immiscible solvents and the desalinated (W)-containing phase is separated from the salt-containing phase, or two or more of the stated process variants a), b), c) and d) are combined.

The so produced (W)-solutions (S) and especially (S') may be of any desired concentration and viscosity, so long as they are stirrable and pourable, e.g. in the range of 50 to 3000 cP at 20° C. Preferred concentrations for the concentrated aqueous solutions (S) and especially (S') are, as stated above, at a (W)-concentration e.g. in the range of 5 to 60%, advantageously 8 to 50%, more preferably 12 to 40%, especially 15–35% by weight.

If desired there may be added one or more formulation additives (F), which may e.g. be ($F_1$) a stabilising additive, ($F_2$) a defoamer, and/or ($F_3$) an additive for protection against the damaging action of microorganisms, e.g. a fungicide or a bacterial growth inhibitor.

As ($F_1$) there may in particular be employed a water soluble solvent or solubiliser and/or a base, e.g. a hydroxy group-containing aliphatic compound, in particular a glycol (such as a $C_{2-4}$-alkylene glycol, diethylene glycol or a polyethylene glycol of average molecular weight $\overline{M}_w$ up to 1500) or a hydroxyalkyl-substituted aliphatic amine, such as mono-. di- or tri-ethanol- or -isopropanol-amine, or a trishydroxymethylaminomethane such as trishydroxymethylaminomethane and 2,2-bis-(hydroxymethyl)-2,2',2"-nitrilotriethanol, or also ammonia or other amine such as mentioned above for salt formation. Among these the tertiary alkanolamines, especially those of formula

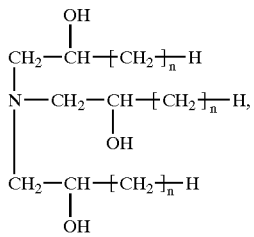
(VIII)

in which n is 0 or 1, preferably 0, are preferred.

These additives ($F_1$)—if employed—are suitably employed in an efficient amount, which preferably is at a concentration of up to 5% by weight, referred to the concentrated (W)-solution, in particular in the range of 0.1 to 5% by weight referred to the concentrated (W)-solution.

According to a preferred feature of the invention the amine from which $M_2$ derives and any ($F_1$) are the same trialkanolamine, i.e. triisopropanolamine or more preferably triethanolamine, which preferably is also a component in the organic phase $L_2$ in desalination process variant (d), if this is employed. In this way particularly stable desalinated compositions (S') can be produced without the addition of any other ($F_1$).

The concentrated solutions (S) of the invention may be of any suitable pH, e.g. from weakly acidic to distinctly basic, preferably nearly neutral to distinctly basic, and M and any ($F_1$) are expediently chosen accordingly, preferably so that an aqueous, 10 weight-% solution of the optical brightener mixture has a pH in the range of 5 to 10, preferably 7 to 9.5.

As additives ($F_2$) or ($F_3$) there may be employed commercially available defoamers and antimicrobial additives, and they are suitably employed in an efficient amount, which usually is in the range recommended for each of the respective commercial products, e.g. at a concentration of up to 0.2% by weight referred to the concentrated aqueous solution, in particular in the range of 0.001 to 0.2, preferably 0.01 to 0.1% by weight referred to the concentrated (W)-solution.

The (W)-solutions (S) of the invention—especially those in which (W) is at least in part in $M_2$-salt form, preferably the desalinated ones (S'), most preferably those further containing ($F_1$) in particular as preferred above—are of outstanding stability to storage and transportation, also under varying temperature conditions, such as frost and heat, not only at high concentrations and viscosities, such as 2000 cP or above (where they do not crystallize or precipitate even by seeding), but also at lower concentrations and viscosities, such as 50 to 1000 cP, (where they are of outstanding stability even when freezing and thawing and/or under heat conditions e.g. up to 50° C.).

The so produced solutions (S) or (S') are ready for use and are easy to handle and meter. If desired the desalinated solutions (S') may be dried to powders or granular pourable products (W').

The mixtures (W) and their solutions (S) and in particular (S') according to the invention are suitable as optical brighteners for the optical brightening of any substrates, which are usually brightenable with each of the optical brighteners (A) or (B) e.g. in sodium salt form. E.g. for the optical brightening of cellulosic substrates, such as textiles, paper, board and non-wovens, by methods conventional per se. Preferably they are suitable for the optical brightening of paper and paper board, e.g. in the paper stuff suspension, or after sheet formation, e.g. in the form of paper web simultaneously with the application of a size or coating. They are distinguished in particular by their high stability, yield and ease of applicability, and—especially the desalinated ones (S')—by the low content of by-products in the backwater of the production of brightened paper or board. They are also of optimum compatibility with with other usual additives conventionally employed in the production of the cellulosic substrate, especially paper and board.

In the following examples parts and percentages are by weight and the temperatures are indicated in degrees Celsius. The employed starting optical brighteners are of the following formulae:

Optical Brightener (A1) of the Formula

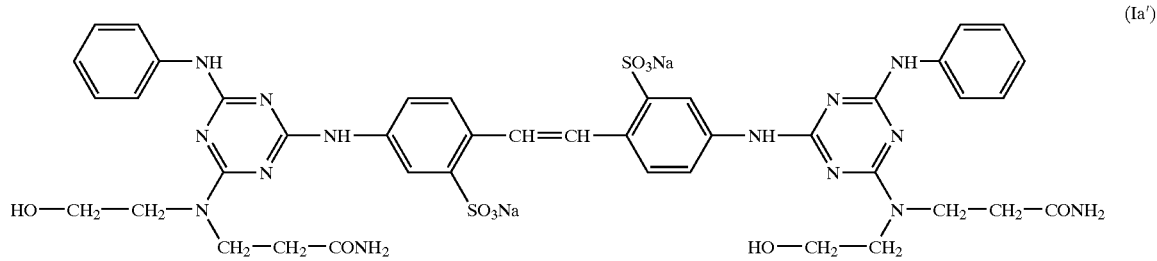
(Ia')

Optical Brightener (B1) of the Formula

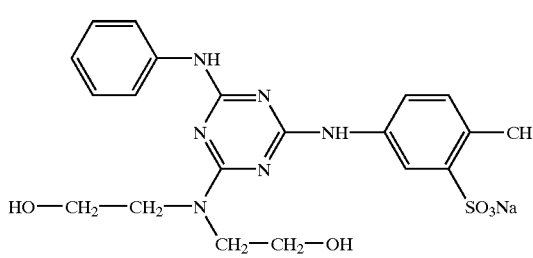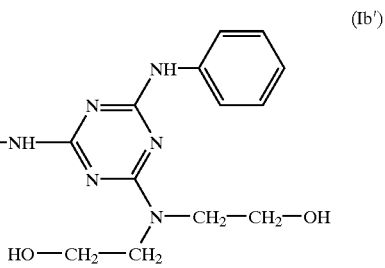

(Ib')

EXAMPLE 1 a) 1000 g of an aqueous solution of Optical Brightener (A1) containing 0.2844 mol of (A1) per kg, and
    56 g of triethanolamine of 98% strength are mixed together and warmed to 60° C. To this is added over 20 min a solution of
    22.4 g aqueous 30% HCl solution in
    200 g demineralized water.

Further heating is applied to 80–85° C. with stirring until a solution forms. Cooling is applied to 35° C. and the mixture left to stand 30 minutes without stirring and the lower organic layer is separated off. This is formulated to a concentration of 0.2844 mol/kg and 7% triethanolamine.

The obtained solution (SA2) contains the optical brightener (A2) which in the form of the free acid corresponds to the formula Yield approximately 960–985 g The separation technique reduces the sodium ion concentration from 1.45% of the original solution to 0.6–0.9% in the final liquid. The theoretical Na-ion concentration value for the half sodium half triethanolammonium salt form is 0.56%. The sodium content in the original solution is higher than theory, due to residual NaCl produced during synthesis. The chloride content is similarly reduced from ca. 1% to typically 0.2–0.3%.

b) A second separation is carried out as above but using the Optical Brightener (B1) at a concentration of 0.2844 mol/kg. The obtained solution (SB2) contains the optical brightener (B2) which in the form of the free acid corresponds to the formula

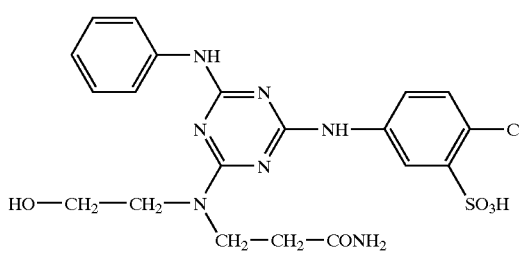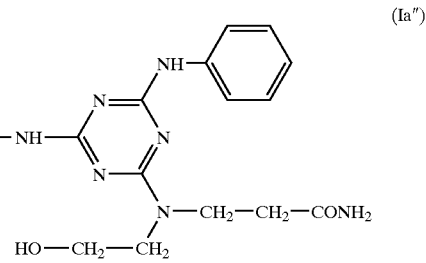

(Ia'')

and is in the form of the mixed sodium and triethanolammonium salt.

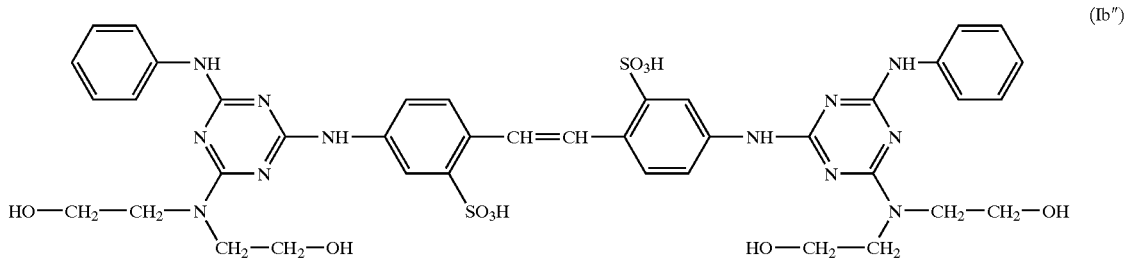

(Ib'')

and is in the form of the mixed sodium and triethanolammonium salt.
c) Finally equal weights of the two formulated liquids (SA2) and (SB2) are mixed together to give a clear light brownish solution (S1) which is stable to the following
Stable upon cooling down to 2° C.—stays clear, doesn't separate
Stable to being stored with crystal seeds at 2° C. for at least 2 weeks, 3 months or more
Stable to being frozen 3 days and then thawed out to give a homogenous clear liquid once more The stability of the mixture (W1) in the form of its solution (S1) in various proportions is superior to the stability of either of the two separate components (SA2) and (SB2). 50:50 (i.e. equimolar) mixtures are preferable but also 70:30 [=solution (S2)] and 30:70 [=solution (S3)] are stable.

A product (S4) of further improved stability is obtained by adding water and triethanolamine to a total optical brightener concentration of 0.2275 mol/kg and a total triethanolamine concentration of 7% (including the one in triethanolammonium salt form in the optical brightener mixture).

Other additives 0.5%–2% of the following also improve stability.

Mono-, di- or triethylene glycol, poly(ethyleneglycol)s ($M_w$ 200, 400, 600, 1000, or 1500), triethanolamine, triisopropanolamine, tris(hydroxymethyl)aminomethane, and 2,2-bis-(hydroxymethyl)-2,2',2''-nitrilotriethanol.

Trace amounts (0.5% or less) of other bases can also be added to raise the pH slightly from 8–8.5 to 9–9.5. The following bases may be used ammonia solution, NaOH, LiOH, KOH, mono-ethanolamine, diethanolamine.

Other mineral acids can also be used in the separation. Replacing the 22.4 g of the 30% HCl with the following has been shown also produce stable liquids: 9.0 g phosphoric acid (98%), or 12.95 g sulphuric acid (98%), or 21.0 g nitric acid (70%).

EXAMPLE 2

500 g Optical Brightener (A1) solution (=0.1422 mol) and
56 g triethanolamine 98% are mixed together and warmed to 60° C.
To this is added over 20 minutes a solution of
22.4 g of aqueous 30% HCl in
200 g demineralized water. This can be left stirring warm 60° C. for an extended period (18 hrs+) without detriment to the final liquid. To this is added over 20 min
500 g Optical Brightener (B1) solution (=0.1422 mol), and heating is applied to 80–85° C. with stirring until a solution forms. Cooling is applied to 35° C. and the mixture left to stand 30 minutes and the lower organic layer is separated off. The separated liquid is formulated to 0.2844 mol/kg and 7% total triethanolamine.
Yield approximately 960–985 g of Solution (S5).

The additives and bases mentioned in Example 1 can be used to improve stability further. The different mineral acids can also be used.

The process may alternatively be carried out by using only half the triethanolamine and HCl for (A1), then adding the other half of the triethanolamine, then the (B1) solution and then the other half of the acid.

EXAMPLE 3 a) 34.6 g of aqueous 30% HCl solution
350 g ice
450 g demineralized water are mixed together and to this is added slowly over ca. 20 min
1000 g Optical Brightener (A1) solution (=0.2844 mol) preheated to 60° C. A thick but stirrable slurry forms and the temperature reaches ca 20° C. To this is now added
50.6 g triethanolamine. And heating is applied to achieve a solution at ca 45–50° C. On cooling again to 20° C. 2 layers form. The mixture is left to stand 30 minutes and the lower organic layer separated off. This is formulated to a concentration of 0.2844 mol/kg and 7% total triethanolamine.
Yield approximately 960–985 g.

If the slurry formed becomes too thick to stir, some (half) of the 50.6 g of triethanolamine can be added half way through the addition of the 1000 g of optical brightener (A1) solution with no detriment.

b) The same process is carried out for the Optical Brightener (B1) and
c) the two products of a) and b) are mixed in equal proportions to give Solution (S6).

Alternatively, instead of 1000 g of the optical brightener (A1) solution, first 500 g of the Optical Brightener (A1) solution and then 500 g of the Optical Brightener (B1) solution are added and then the two are separated together, analogously as described in Example 3a), to give Solution (S7).

Alternatively all or half of the acid may be put in at the beginning.

Again the different acids, additives and bases listed above in Example 1 can be used.

EXAMPLE 4 a) 34.6 g aqueous HCl solution (30%)
350 g ice
450 g demineralized water are mixed together and to this is added slowly over ca. 20 min
1000 g Optical Brightener (A1) solution of concentration 0.2844 mol/kg is preheated to 60° C. A thick but stirrable slurry forms and the temperature reaches ca 20° C. This is filtered and the presscake washed with cold water acidified to pH 1 with a minimum of HCl. The presscake is pressed as dry as possible in the filter and then redissolved in
400 g demineralized water and
50.6 g triethanolamine. Heating is applied to achieve a solution at ca 50° C. This is formulated to 0.2844 mol/kg and 7% total triethanolamine.
Yield approx. 960–985 g
b) The same process is carried out for the Optical Brightener (B1) and
c) the two products are mixed in equal proportions to give Solution (S8).

Again the different acids, additives and bases stated in the above Examples can be used.

Similarly 500 g of the Optical Brightener (A1) solution and then 500 g of the Optical Brightener (B1) solution are added and then the two are isolated and formulated together analogously to Example 4a) to give Solution (S9).

EXAMPLE 5 a) 1198 g demineralized water
107.9 g triethanolamine and
86.3 g aqueous 30% HCl are mixed together. This exotherms to ca. 28° C. and is further heated to 35° C. To this is added slowly over ca. 20 min
1000 g Optical Brightener (A1) solution (=0.2844 mol) preheated to 60° C. A soft precipitate initially forms which melts to form an emulsion as the temperature reaches ca 42° C., the final temperature reached being about 45° C. This is stirred at 45° C. for 1 hour then stood for 90 minutes without stirring at 45° C.

This is formulated to 0.2844 mol/kg and 7% total triethanolamine.

Yield approximately 960–985 g.

b) The same process is carried out for the Optical Brightener (B1) and c) the two mixed in equal proportions to give Solution (S10).

Again the different acids, additives and bases stated in the above Examples can be used.

Similarly 500 g of the Optical Brightener (A1) solution and then 500 g of the Optical Brightener (B1) solution are added and then the two (A2) and (B2) are separated together and formulated together analogously to Example 5a) to give Solution (S11).

EXAMPLE 6

1000 g demineralized water
1000 g Optical Brightener (A1) solution (=0.2844 mol) and
1000 g Optical Brightener (B1) solution (=0.2844 mol) are mixed together and heated to 50° C.

This is ultrafiltered through a membrane over ca. 8 hours with a permeation rate of about 1 liter/hour. A solution of
53.0 g triethanolamine and
43.1 g of HCl solution of 30% strength in
660 g demineralized water is slowly added during this time.

As the triethanolamine hydrochloride solution is added the Optical Brightener mixture temporarily precipitates but rapidly dissolves. If the Optical Brightener mixture stays out of solution, then a minimum amount of triethanolamine can be added. Also during the 8 hours as the total volume is kept constant with more water. The sodium content and the chloride content are monitored—when sodium ion content is 0.6% or less and the chloride ion content 0.1–0.2%, the volume is allowed to reduce to 1750 ml.

The obtained product is formulated to an optical brightener concentration of 0.2844 mol/kg and 7% total triethanolamine.

Yield approximately 1860–1930 g of Solution (S12).

The same process can be carried out for each of the two Optical Brighteners (A1) and (B1) separately and then (A2) and (B2) in the form of the produced solutions can be mixed afterwards [=Solution (S13)].

Again the different acids, additives and bases noted above can be used.

EXAMPLE 7

To 8333 g of an aqueous solution of 1 mole of the compound of formula at 60° C. is added 1.75 mole of diethanolamine (208.8 g of an 88% solution in water) and then 1.75 mole of amine of formula

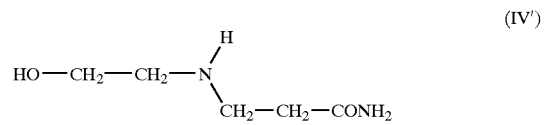

(321 g of a 72% solution in water). The mixture is heated to reflux and maintained at reflux for 4 hours, while controlling the pH to 8.5–9.0 with the addition of minimal amounts of NaOH. An oil forms as the reaction proceeds. 44.3 g of sodium chloride is added, and the mixture is stirred for 10 minutes and then cooled to 90° C. with slow agitation (the agitation is sufficiently slow to prevent aeration and flotation of the oil). Stirring is stopped and the mixture is allowed to stand for 10 minutes. Two layers form and the lower organic layer is separated from the top, salt containing, aqueous layer and made to 0.2844 mol/kg and kept at 60° C. Yield approximately 3300–3500 kg.

Following the conditions laid out in Example 5, a second separation is carried out. In a separate vessel is mixed 4193 g of demineralized water, 377.7 g of triethanolamine and 302.0 g of 30% hydrochloric acid. As before an exotherm heats the mixture to ca. 28° C. and heating is applied to reach 35° C. The solution from the first stage at 60° C. is added slowly to this and as before the temperature slowly rises to about 42° C. at the end of the addition. Further heating is applied with slow stirring so that the optical brightener melts and forms an emulsion. Stirring is continued for 1 hour, then it is stopped and the mixture is allowed to stand for 90 minutes and the oil phase is separated. The oil is formulated as before to an optical brightener mixture concentration of 0.2844 mol/kg and 7% of total triethanolamine. Yield approximately 3300–3400 g of Solution (S14).

The formed optical brightener mixture is a mixture of the two optical brighteners (A2) and (B2) and a third new asymmetrical species (C2) which in the form of the free acid corresponds to the formula

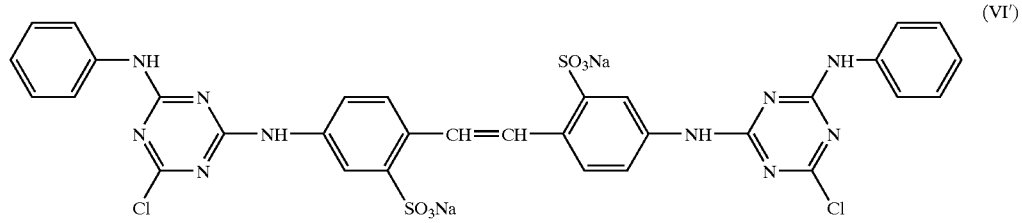

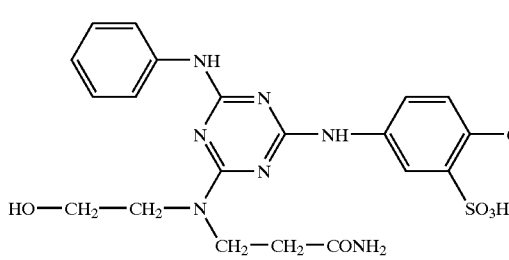 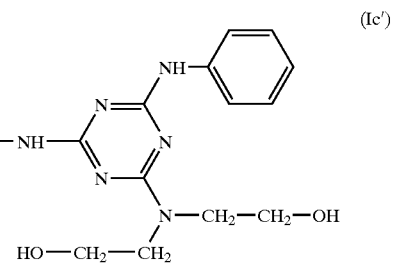

(Ic')

and is obtained in the mixed sodium/triethanolammonium salt form.

EXAMPLE 8

Here each of the optical brighteners (A2) and (B2) is synthetised separately by reaction of the intermediate of formula (VI') with the amine of formula (IV') and with diethanolamine, in the presence of triethanolamine.

a) For 1 mole of Optical Brightener (A1) solution (3.52 kg of solution), 0.75 mole of triethanolamine (112 g) is required for the formation of enough triethanolamine-HCl in situ during the condensation reaction. A minimum amount of added NaCl encourages two layers to form. The separation is carried out at 30° C. Some triethanolamine-HCl (about a quarter of it) is lost in the aqueous layer.
b) Optical Brightener (B1) is processed analogously.
c) The two separated bottom organic layers are mixed with each other and the mixture is formulated to a total optical brightener mixture concentration of 0.2844 mol/kg and 7% total triethanolamine to give Solution (S15).

The other additives and pH adjusting bases are preferred in these formulations since only one separation is carried out for each brightener.

Application Example A 200 g of a pulp suspension (2.5% aqueous suspension of a 50% mixture of bleached soft wood and hard wood pulps beaten to a freeness of about 20°SR) is measured into a beaker and stirred, 40% filler suspension (80 g of 100 g/liter calcium carbonate suspension in water) is added (typically Snowcall 60 from Croxton and Garry Ltd.). The suspension is stirred for one minute and p % of the first product of Example 1, i.e. of Solution (S1), is added (p=0, 0.1, 0.2, 0.4, 0.8, 1, 1.4, 1.8 and 2; p % being related to the dry pulp and p=0 representing the blank). After the addition the mixture is stirred for a further 0.5 minutes and then 1.7% (3.4 g) of neutral size is added (typically a dispersion of 2.5 g of Aquapel 360×in water—Aquapel 360×is an alkyl-ketene dimer size suspension from Hercules Ltd.). After the addition of the size a retention aid may be added—typically Cartaretin PC. The mixture is then diluted to one litre and the paper sheet is formed on a laboratory sheet former (basically this is a cylinder with a wire gauze at the bottom—the cylinder is partly filled with water, the pulp suspension is added, air is then blown through to ensure the pulp is well dispersed, a vacuum is then applied and the pulp slurry is pulled through the wire to leave a paper sheet, this sheet is removed from the wire and pressed and dried). The sheet is left in a humidity cabinet to achieve equlibrium and then the whiteness is measured using a Datacolor ELREPHO 2000 spectrophometer. The measured values show that with the optical brightener mixture a high whiteness degree and yield is achieved. The COD and nitrogen content of the backwater are very low.

Application Example B 200 g of a pulp suspension (2.5% aqueous suspension of a 50% mixture of bleached soft wood and hard wood pulps beaten to a freeness of about 20°SR) is measured into a beaker and stirred and 20% filler suspension (40 g of 100 g/litre china clay suspension in water) is added (typically China Clay grade B from EEC Ltd.). The suspension is stirred for one minute and p % of the first product of Example 1, i.e. of Solution (S1), is added (p=0, 0.1, 0.2, 0.4, 0.8, 1, 1.4, 1.8 and 2; p % being related to the dry pulp and p=0 representing the blank). After the addition the mixture is stirred for a further 5 minutes and then 2% of rosin size solution is added (typically "T size 22/30" from Hercules), the mixture is stirred for a further 2 minutes and then 3 ml of alum solution (50 g alum in 1 litre water) are added and the mixture is stirred for a further 2 minutes. The mixture is then diluted to one litre and the paper sheet is formed on a laboratory sheet former. The sheet is left in a humidity cabinet to achieve equlibrium and then the whiteness is measured using a Datacolor ELREPHO 2000 Spectrophotometer. The measured values show The measured values show that with the optical brightener mixture a high whiteness degree and yield is achieved. The COD and nitrogen content of the backwater are very low.

Application Example C

A coating composition is prepared containing 3000 parts chalk (fine, white, high purity calcium carbonate with a density by ISO 787/10 of 2.7, commercially available under the trade name HYDROCARB OG of Plüss-Stauffer AG, Oftringen, Switzerland), 1932 parts water, 18 parts cationic dispersing agent, and 600 parts latex (a copolymer of n-butyl acrylate and styrene latex of pH 7.5–8.5, commercially available under the trade name ACRONAL S320D). A predetermined amount of the first product of Example 1, i.e. of Solution (St), (0, 0.313, 0.625, 0.938, 1.25 and 1.875 mmol/kg referred to the optical brightener mixture) is added with stirring to the coating composition, and the solids content is adjusted to 55% by the addition of water. The so prepared coating composition is then applied to a commercial 75 g/m2 neutral-sized (with conventional alkyl ketene dimer), bleached paper base sheet, using an automatic wire-wound bar applicator with a standard speed setting and a standard load on the bar. The coated paper is dried for 5 minutes at 70° C. in a hot air flow. The dried paper is allowed to condition, then measured for CIE whiteness on a calibrated Datacolor ELREPHO 2000 spectrophotometer. The measured values show that with the optical brightener mixture a high whiteness degree and yield is achieved.

Analogously as the first product of Example 1 or Solution (S1), equivalent amounts of the further products of Example 1 and of the products of each of Examples 2–8 [in the form of Solutions (S2) to (S15)] and of the modified formulations of each of Examples 1–8 are employed in Application Examples A, B and C.

What is claimed is:

1. An optical brightener (C) of formula (Ic):

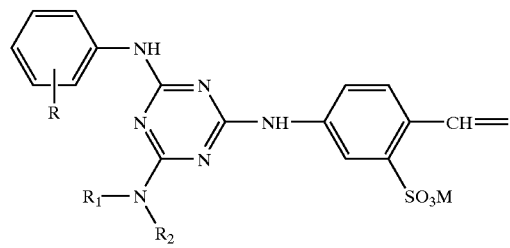

or

R₁ and R₂ together with the nitrogen to which they are linked form a carboxypyrrolidine ring, $R_3$ signifies hydrogen, unsubstituted $C_{1-6}$-alkyl, $C_{2-6}$-alkyl substituted with hydroxy or methoxy, or hydroxy- or methoxy-($C_{2-3}$-alkoxy)-($C_{2-3}$-alkyl), $R_4$ signifies hydrogen, unsubstituted $C_{1-8}$-alkyl, $C_{2-6}$-alkyl, substituted with hydroxy or methoxy, or hydroxy- or methoxy-($C_{2-3}$-alkoxy)-($C_{2-3}$-alkyl), or $R_3$ and $R_4$ together with the nitrogen to which they are linked form a morpholine ring, and M signifies an equivalent of a cation.

2. A substrate optically brightened with the optical brightener of claim 1.

3. An optical brightener mixture (W) comprising an optical brightener (A) of formula

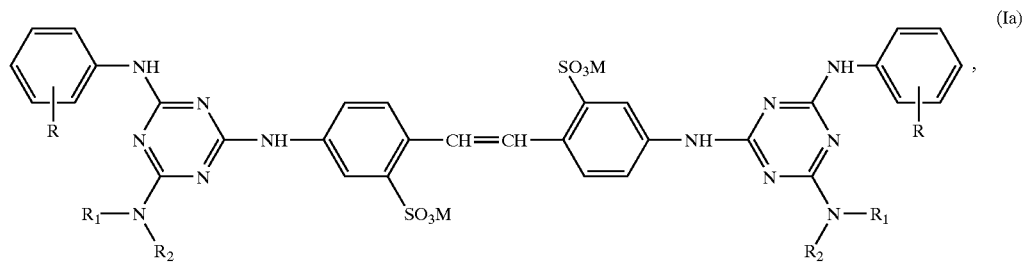

(Ia)

wherein

R signifies hydrogen or methyl, $R_1$ signifies hydrogen, unsubstituted $C_{1-6}$-alkyl, $C_{1-6}$-alkyl substituted with carbamoyl or carboxy, $C_{2-6}$-alkyl substituted with hydroxy or methoxy, hydroxy- or methoxy-($C_{2-3}$-alkoxy)-($C_{2-3}$-alkyl)

$R_2$ signifies $C_{1-6}$-alkyl substituted with carbamoyl or carboxy, or

R₁ and R₂ together with the nitrogen to which they are linked form a carboxypyrrolidine ring, and M signifies an equivalent of a cation, and an optical brightener (B) of formula -continued

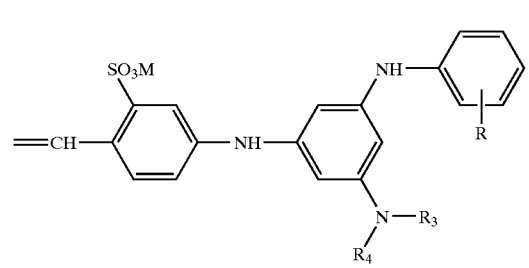

wherein

R signifies hydrogen or methyl, $R_1$ signifies hydrogen, unsubstituted $C_{1-6}$-alkyl, $C_{1-6}$-alkyl substituted with carbamoyl or carboxy, $C_{2-6}$-alkyl substituted with hydroxy or methoxy, hydroxy- or methoxy-($C_{2-3}$-alkoxy)-($C_{2-3}$-alkyl)

$R_2$ signifies $C_{1-6}$-alkyl substituted with carbamoyl or carboxy,

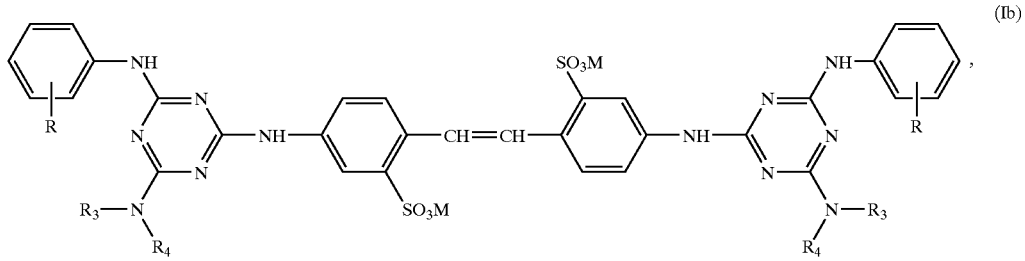

wherein
  R signifies hydrogen or methyl,
  $R_3$ signifies hydrogen, unsubstituted $C_{1-6}$-alkyl, $C_{2-6}$-alkyl substituted with hydroxy or methoxy, or hydroxy- or methoxy-$(C_{2-3}$-alkoxy)-$(C_{2-3}$-alkyl),
  $R_4$ signifies hydrogen, unsubstituted $C_{1-6}$-alkyl, $C_{2-6}$-alkyl substituted with hydroxy or methoxy, or hydroxy- or methoxy-$(C_{2-3}$-alkoxy)-$(C_{2-3}$-alkyl),
or
  $R_3$ and $R_4$ together with the nitrogen to which they are linked form a morpholine ring,
and
  M signifies an equivalent of a cation.

4. An optical brightener mixture (W) according to claim 3, further comprising a compound (C) of the formula

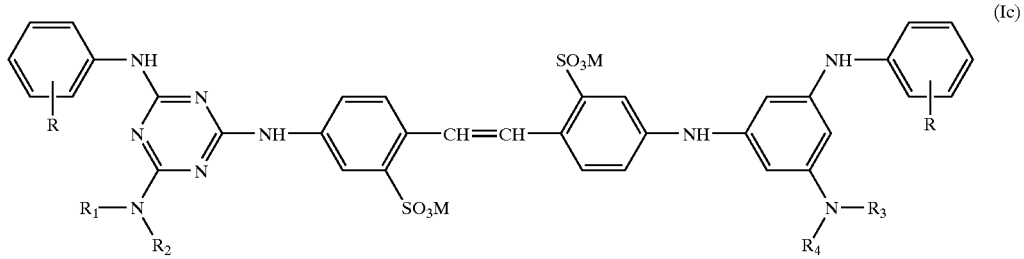

where R, $R_1$, $R_2$, $R_3$ and $R_4$ and M are as defined in claim 3.

5. An optical brightener mixture (W) according to claim 4, wherein the cations of M are selected from the group consisting of
  $M_1$ alkali metal cations and unsubstituted ammonium
and
  $M_2$ ammonium mono-; di- or trisubstituted with $C_{1-4}$-alkyl and/or $C_{2-3}$-hydroxyalkyl.

6. An optical brightener mixture (W) according to claim 5, wherein cations $M_1$ and $M_2$ are both present as M in the mixture.

7. An optical brightener mixture (W) according to claim 3, wherein the cations of M are selected from the group consisting of:
  $M_1$ alkali metal cations and unsubstituted ammonium
and
  M2 ammonium mono-, di- or unsubstituted with $C_{1-4}$-alkyl and/or $C_{2-3}$-hydroxyalkyl.

8. An optical brightener mixture (W) according to claim 7, wherein cations $M_1$ and $M_2$ are both present as M in the mixture.

9. A process for the production of a mixture (W) comprising the steps of mixing an optical brightener (A) of formula

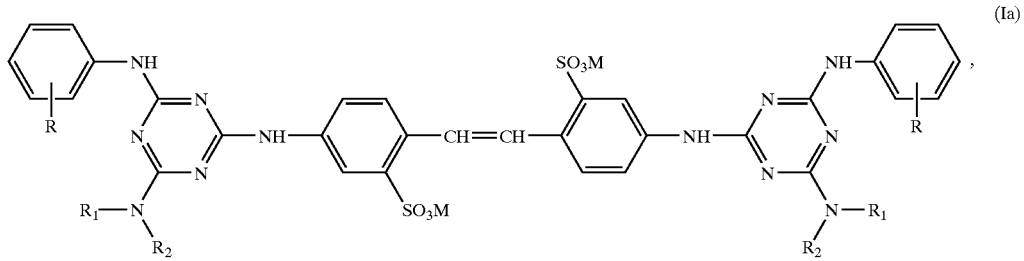

wherein
  R signifies hydrogen or methyl, $R_1$ signifies hydrogen, unsubstituted $C_{1-8}$-alkyl, $C_{1-6}$-alkyl substituted with carbamoyl or carboxy, $C_{2-6}$-alkyl substituted with hydroxy or methoxy, hydroxy- or methoxy-$(C_{2-3}$-alkoxy$)$-$(C_{2-3}$-alkyl$)$ $R_2$ signifies $C_{1-6}$-alkyl substituted with carbamoyl or carboxy, or $R_1$ and $R_2$ together with the nitrogen to which they are linked form a carboxypyrrolidine ring, and M signifies an equivalent of a cation, and an optical brightener (B) of formula, optionally in the presence of water

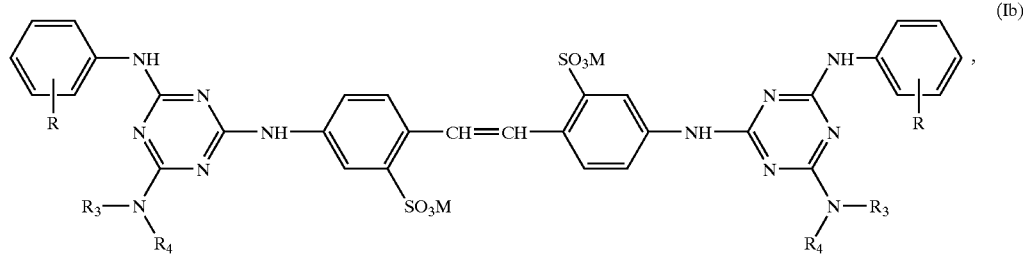

wherein

R signifies hydrogen or methyl, $R_3$ signifies hydrogen, unsubstituted $C_{1-6}$-alkyl, $C_{2-6}$-alkyl substituted with hydroxy or methoxy, or hydroxy- or methoxy-$(C_{2-3}$-alkoxy$)$-$(C_{2-3}$-alkyl$)$, $R_4$ signifies hydrogen, unsubstituted $C_{1-6}$-alkyl, $C_{2-6}$-alkyl substituted with hydroxy or methoxy, or hydroxy- or methoxy-$(C_{2-3}$-alkoxy$)$-$(C_{2-3}$-alkyl$)$, or $R_3$ and $R_4$ together with the nitrogen to which they are linked form a morpholine ring, and M signifies an equivalent of a cation.

10. A process for the production of a mixture (W) comprising the step of reacting a compound of formula and

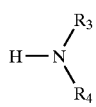

wherein $R_1$ signifies hydrogen, unsubstituted $C_{1-6}$-alkyl, $C_{1-6}$-alkyl substituted with carbamoyl or carboxy, $C_{2-6}$-alkyl substituted with hydroxy or methoxy, hydroxy- or methoxy-$(C_{2-3}$-alkoxy$)$-$(C_{2-3}$-alkyl$)$ $R_2$ signifies $C_{1-6}$-alkyl substituted with carbamoyl or carboxy, or

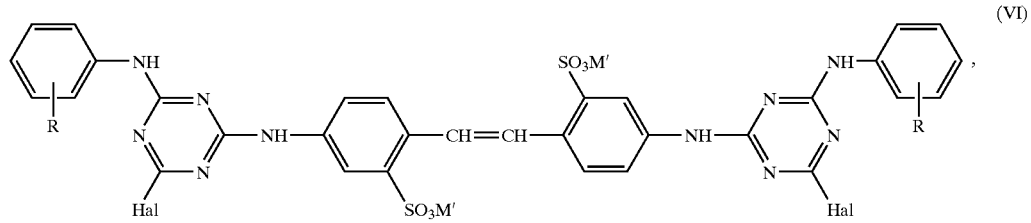

wherein

R is hydrogen or methyl

Hal is halogen and

M' is an alkali metal cation, is reacted with a mixture of amines of formulae

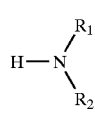

$R_1$ and $R_2$ together with the nitrogen to which they are linked form a carboxypyrrolidine ring, $R_3$ is hydrogen, unsubstituted $C_{1-6}$-alkyl, $C_{2-6}$-alkyl substituted with hydroxy or methoxy, or hydroxy- or methoxy-$(C_{2-3}$-alkoxy$)$-$(C_{2-3}$-alkyl$)$, $R_4$ signifies hydrogen, unsubstituted $C_{1-8}$-alkyl, $C_{2-8}$-alkyl substituted with hydroxy or methoxy, or hydroxy- or methoxy-$(C_{2-3}$-alkoxy$)$-$(C_{2-3}$-alkyl$)$, or $R_3$ and $R_4$ together with the nitrogen to which they are linked form a morpholine ring, to form a mixture of a compound (A) of formula (Ia)

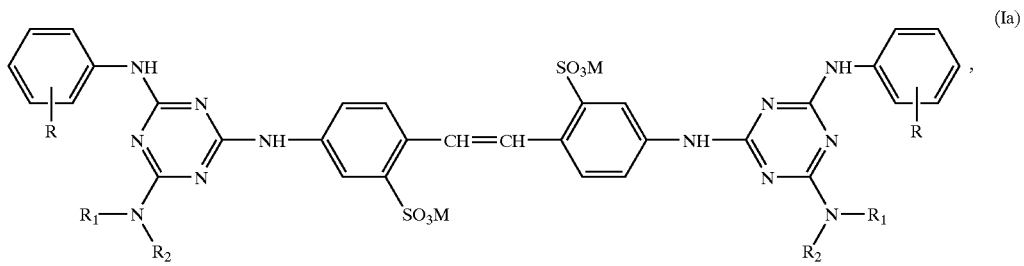

a compound (B) of formula (Ib)

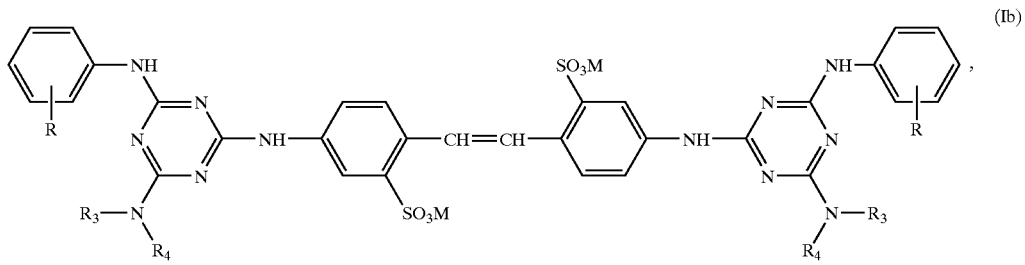

and a compound (C) of the formula (Ic).

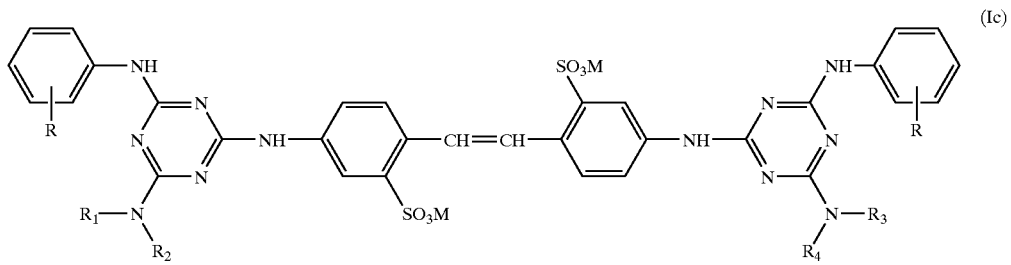

wherein M is an equivalent of a cation.

11. An aqueous concentrated composition (S) comprising an optical brightener mixture (W) according to claim 3.

12. An aqueous concentrated composition (S) according to claim 11, further comprising at least one additive selected from the group consisting of
($F_1$) a stabilising additive,
($F_2$) a defoamer, and
($F_3$) an additive for protection against the damaging action of microorganisms.

13. An aqueous concentrated composition (S) according to claim 11, which is a concentrated solution (S') wherein the content of electrolytes other than those involved in salt formation in compounds (A) arid (B) is less than 5% by weight referred to the weight of the optical brightener mixture (W).

14. An aqueous concentrated composition (S) according to claim 13, further comprising at least one additive (F) selected from the group consisting of
($F_1$) a stabilising additive,
($F_2$) a defoamer, and
($F_3$) an additive for protection against the damaging action of microorganisms.

15. An aqueous concentrated composition (S) of an optical brightener mixture (W) according to claim 4.

16. An aqueous concentrated composition (S) according to claim 15, further comprising at least one additive selected from the group consisting of
($F_1$) a stabilising additive,
($F_2$) a defoamer, and
($F_3$) an additive for protection against the damaging action of microorganisms.

17. An aqueous concentrated composition (S) according to claim 15, which is a concentrated solution (S') wherein the content of electrolytes other than those involved in salt formation in the compounds (A), (B) and (C), is less than 5% by weight referred to the weight of the optical brightener mixture (W).

18. An aqueous concentrated composition (S) according to claim 17, further comprising at least one additive (F) selected from the group consisting of
($F_1$) a stabilising additive,
($F_2$) a defoamer, and
($F_3$) an additive for protection against the damaging action of microorganisms.

19. A process for the production of a solution (S') according to claim 13, comprising at least one step of steps a), b), c) or d):
a) a salt-containing solution (S") of optical brightener mixture (W) is desalinated by membrane filtration
or b) the optical brightener mixture (W) is precipitated in acid form by acidification of a salt-containing aqueous solution (S") of optical brightener mixture (W) with a strong mineral acid, separated and redissolved in salt form by reaction with a suitable base or base mixture or c) the optical brightener mixture (W) solution (S") is treated with an acid ion exchange resin or acid membrane in the presence of amine suitable for introducing $M_2$, wherein $M_2$ is ammonium mono-, di- or trisubstituted with $C_{1-4}$-alkyl and/or $C_{2-3}$-hydroxyalkyl, or d) a salt-containing optical brightener mixture (W) is selectively separated in a system of two liquid phases $L_1$ and $L_2$, of which $L_1$ is aqueous and dissolves the extraneous electrolytes and $L_2$ is organic and contains optical brightener mixture (W) and may contain a minor proportion of dissolved water, and the desalinated optical brightener mixture (W) containing phase $L_2$ is separated from the salt-containing aqueous phase $L_1$, or the salt-containing optical brightener mixture (W) is selectively dissolved in a system of two immiscible solvents and the desalinated optical brightener mixture (W)-containing phase is separated from the salt-containing phase.

20. The process process according to claim 19, further comprising the step of drying the desalinated solution (S') of the optical brightener mixture (W) to a powder or granulate.

21. A process for the production of a solution (S') according to claim 17, comprising at least one step of steps a), b), c) or d):

a) a salt-containing solution (S") of optical brightener mixture (W) is desalinated by membrane filtration or b) the optical brightener mixture (W) is precipitated in acid form by acidification of a salt-containing aqueous solution (S") of optical brightener mixture (W) with a strong mineral acid, separated and redissolved in salt form by reaction with a suitable base or base mixture or c) the optical brightener mixture (W) solution (S") is treated with an acid ion exchange resin or acid membrane in the presence of amine suitable for introducing $M_2$, wherein $M_2$ is ammonium mono-, di- or trisubstituted with $C_{1-4}$-alkyl and/or $C_{2-3}$-hydroxyalkyl, or d) a salt-containing optical brightener mixture (W) is selectively separated in a system of two liquid phases $L_1$ and $L_2$, of which $L_1$ is aqueous and dissolves the extraneous electrolytes and $L_2$ is organic and contains optical brightener mixture (W) and may contain a minor proportion of dissolved water, and the desalinated optical brightener mixture (W) containing phase $L_2$ is separated from the salt-containing aqueous phase $L_1$, or the salt-containing optical brightener mixture (W) is selectively dissolved in a system of two immiscible solvents and the desalinated optical brightener mixture (W)-containing phase is separated from the salt-containing phase.

22. The process according to claim 21, further comprising the step of drying the desalinated solution (S') of the optical brightener mixture (W) to a powder or granulate.

23. A method for optically brightening a substrate brightenable with anionic optical brighteners comprising the steps of:

providing a substrate brightenable with anionic optical brighteners;

providing a optical brightener mixture (W) according to claim 3; and contacting said substrate with the optical brightener mixture (W).

24. A method for optically brightening a substrate brightenable with anionic optical brighteners according to claim 23, where said substrate is a cellulosic substrate.

25. A method for optically brightening a substrate brightenable with anionic optical brighteners according to claim 24, where said cellulosic substrate is paper.

26. An optically brightened substrate made in accordance with the method of claim 23.

27. A method for optically brightening a substrate brightenable with anionic optical brighteners comprising the steps of:

providing a substrate brightenable with anionic optical brighteners;

providing a mixture (W) according to claim 4; and contacting said substrate with said mixture (W).

28. A method for optically brightening a substrate brightenable with anionic optical brighteners according to claim 27, where said substrate is a cellulosic substrate.

29. A method for optically brightening a substrate brightenable with anionic optical brighteners according to claim 28, where said cellulosic substrate is paper.

30. An optically brightened substrate made in accordance with the method of claim 27.

31. A method for optically brightening a substrate brightenable with anionic optical brighteners comprising the steps of:

providing a substrate brightenable with anionic optical brighteners;

providing an aqueous concentrated composition (S) according to claim 11; and contacting said substrate with the aqueous concentrated composition (S).

32. A method for optically brightening a substrate brightenable with anionic optical brighteners comprising the steps of:

providing a substrate brightenable with anionic optical brighteners;

providing a optical brightener mixture (W) according to claim 8; and contacting said substrate with the optical brightener mixture (W).

33. A substrate optically brightened in accordance with the method of claim 31.

34. A method for optically brightening a substrate brightenable with anionic optical brighteners comprising the steps of:

providing a substrate brightenable with anionic optical brighteners;

providing an aqueous concentrated composition (S) according to claim 13; and contacting said substrate with the aqueous concentrated composition (S).

35. A method for optically brightening a substrate brightenable with anionic optical brighteners comprising the steps of:

providing a substrate brightenable with anionic optical brighteners;

providing an aqueous concentrated composition (S) according to claim 15; and contacting said substrate with the aqueous concentrated composition (S).

36. A method for optically brightening a substrate brightenable with anionic optical brighteners comprising the steps of:
   providing a substrate brightenable with anionic optical brighteners;
   providing an aqueous concentrated composition (S) according to claim 17; and
   contacting said substrate with the aqueous concentrated composition (S).

* * * * *